Oct. 14, 1952 P. KOLLSMAN 2,614,027
DEVICE FOR STERILIZING HOLLOW THERMOPLASTIC
ARTICLES BY HEAT
Filed April 28, 1948

INVENTOR.
PAUL KOLLSMAN
BY Howard G. Russell.
his ATTORNEY

Patented Oct. 14, 1952

2,614,027

UNITED STATES PATENT OFFICE 2,614,027

DEVICE FOR STERILIZING HOLLOW THERMOPLASTIC ARTICLES BY HEAT

Paul Kollsman, New York, N. Y.

Application April 28, 1948, Serial No. 23,826

3 Claims. (Cl. 21—96)

1

This invention relates to the art of sterilizing articles by heat and has particular application to the sterilizing of articles made of thermoplastic material which ordinarily do not lend themselves to treatment at ordinary sterilizing temperatures because of their inherent properties to soften and deform.

The bodies of hypodermic syringes, ampules, and receptacles for liquid or dry pharmaceutical materials are advantageously made from thermoplastic materials because of the ease with which such materials can be formed to precise dimensions within relatively close tolerances.

It is generally necessary to sterilize such articles after machining, molding, pressing, assembling or otherwise handling them. Sterilization by heat, which is generally accepted as one of the most efficient methods of sterilizing, leads to difficulties if applied to thermoplastics materials because of the inability of the material to withstand sterilizing temperatures for the necessary period of time without deformation due to the fact that the material assumes a plastic or semi-plastic state if heated.

The difficulty of sterilizing thermoplastic articles has been a major obstacle to a more extensive use of thermoplastic materials for the aforementioned purposes in spite of the many advantages which thermoplastic materials offer in other respects over more conventional materials such as metal and glass.

The invention provides an apparatus for heat sterilizing hollow articles, particularly hypodermic syringes, made from thermoplastic materials. According to the invention, the hollow article to be sterilized is confined or supported throughout the heating period in such a way that it will not warp, sag, or collapse and that after sterilization it has the precise dimensions which it is intended to have. More specifically, this is accomplished by urging the hollow article against a confining surface of appropriate dimensions by application of fluid pressure in such a way that the walls of the article itself constitute a form of membrane on which the pressure acts. According to the invention the article is acted upon by differential pressure applied to opposite sides of the wall of the article and it is further acted upon by a rigid, form constraining surface on one side. My co-pending application, Serial No. 23,825, filed April 28, 1948, discloses and claims an arrangement in which the article is held between two from constraining members.

The invention thus makes it possible to subject an article of a thermoplastic material which ordinarily begins to deform materially at temperatures of approximately 85 degrees centigrade to sterilizing temperatures of the order of 145 degrees centigrade without impairment or sacrifice of the accuracy of its shape.

The various objects, features and advantages of the invention will appear more fully from the detailed description which follows accompanied by drawings showing for the purpose of illustration preferred embodiments of the invention. The invention also consists in certain new and original features of construction and combination of elements hereinafter set forth and claimed.

Although the characteristic features of the invention which are believed to be novel will be particularly pointed out in the claims appended hereto, the invention itself, its objects and advantages and the manner in which it may be carried out may be better understood by referring to the following description taken in connection with the accompanying drawings forming a part of it in which:

Figure 1:
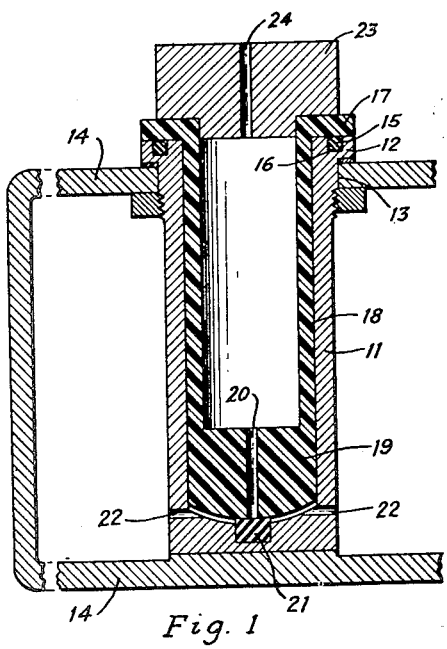
Figure 1 is a sectional side view of an article supporting and constraining device for use in sterilizing thermoplastic articles under heat and pressure.

In the following description and in the claims, various details will be identified by specific names for convenience. The names, however, are intended to be as generic in their application as the art will permit. Corresponding reference characters refer to corresponding parts in the several figures of the drawings.

In the drawings accompanying, and forming part of, this specification, certain specific disclosure of the invention is made for the purpose of explanation of broader aspects of the invention, but it is understood that the details may be modified in various respects without departure from the principles of the invention, and that the invention may be applied to other structures than the ones shown.

The device shown in Figure 1 comprises a confining outer member or shell 11 having a flange 12 resting in an aperture 13 of a hollow casing 14. The flange 12 of the outer member 11 includes a sealing ring or gasket 15 resting in an annular groove 16 to provide a seal against which the flange 17 rests of a thermoplastic element 18 about to be sterilized. The illustrated element 18 is a barrel of a hypodermic syringe and includes a front portion 19 having a bore 20 therethrough into which a needle assembly may later be inserted.

The outer supporting shell includes a further seal 21 for closing the bore 20 of the barrel 18. The interior of the supporting shell 11 communicates with the inside of the casing 14 through passages 22.

A plug 23 having a vent passage 24 rests on the flange 17 of the thermoplastic syringe barrel 18 and aids in supporting the top portion of the syringe barrel. Its weight tends to urge the barrel into contact with the seals 15 and 21.

The device shown in Figure 1 may be used as follows:

The hollow syringe barrel 18 of thermoplastic material which is intended to be sterilized by heat is first inserted into the confining shell 11 into which it fits with preferably a slight amount of play. The plug 23 is then placed on the barrel 25 urging the flange 17 of the syringe barrel into contact with the gasket 15 and the front portion of the syringe barrel into contact with the seal 21. The air pressure in the casing 14 is then reduced causing the syringe barrel to rest tightly against the seals 15 and 21, respectively.

Subsequent application of sterilizing heat causes the thermoplastic material to assume a plastic or semi-plastic state. The pressure difference between the outside and the inside of the casing 14 causes the outer walls of the syringe to rest tightly against the contacting inner surface of the supporting shell 11 whereby the syringe barrel is protected against deformation, warping or collapsing of its walls. During the heating, the barrel of the syringe also expands at a rate greater than the rate of expansion of its confining shell 11. The fluid pressure acting on the inside wall of the syringe body together with the forces caused by the thermal expansion urge the outer walls of the barrel against the inner surface of the supporting shell with a force sufficient to correct minor inaccuracies in the shape of the barrel.

After a sufficient period of time has elapsed, the device is permitted to cool. This causes the syringe barrel to contract slightly and at a rate greater than the rate of contraction of the walls of the outer shell 11. This causes the syringe barrel to shrink slightly so that after equalization of pressure the sterile barrel may be removed from the shell.

Figure 2:
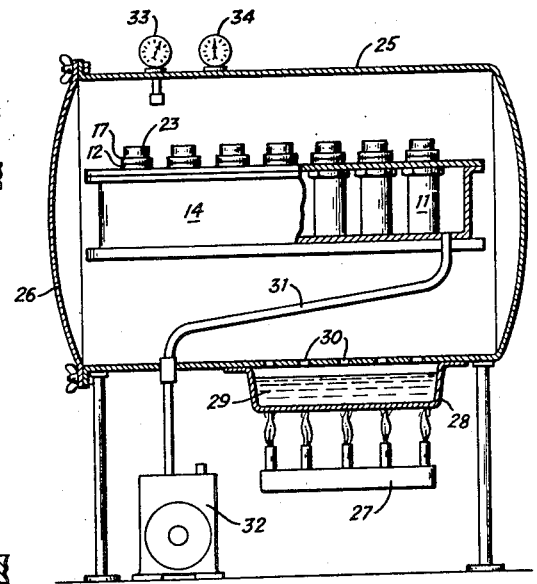
Figure 2 is a side view, partly in section, of an apparatus for heat sterilizing thermoplastic articles.

The sterilizing device illustrated in Figure 2 comprises an autoclave 25 having a removable cover or door 26. The autoclave may be heated by a heating unit 27 associated with a chamber or boiler portion 28 containing a charge 29 of water or other suitable liquid. The chamber 28 communicates with the interior of the autoclave through passages 30 whereby steam may be admitted into the interior of the autoclave for the purpose of heating the contents of the autoclave and furnishing the desired pressure.

The autoclave contains a casing 14 supporting a plurality of confining shells for syringe barrels or other hollow articles to be sterilized. A duct 31 leads from the interior of the casing 14 through the wall of the autoclave to a pump 32 or other suitable source of vacuum in order to reduce the pressure inside the casing 14. Suitable indicators 33 and 34 may be provided for observing temperature and pressure conditions inside the autoclave.

Figure 3:
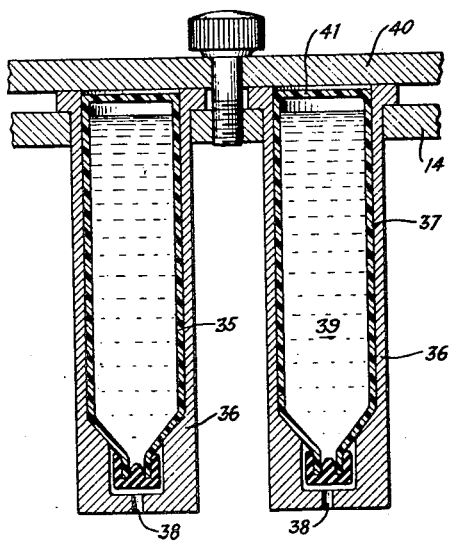
Figure 3 is a sectional side view of a device for sterilizing liquid filled thermoplastic receptacles.

The device shown in Figure 3 is particularly designed for sterilizing hollow receptacles containing a charge of liquid. The receptacles 35 are supported in outer shells 36 having an interior supporting surface 37 and communicating with the interior of a chamber 14 through vent apertures 38. In the form of device shown in Figure 3, the liquid charge 39 contained in the receptacle expands and provides internal vapor pressure during heating of the device to sterilizing temperatures for urging the walls of the receptacles against the supporting walls 37 of the shell. Simultaneously, the interior of the chamber 14 may be evacuated in order to increase the force with which the walls of the receptacles are urged against the supporting surfaces surrounding them. A cover member 40 may be employed for supporting the bottom surface 41 of the receptacles.

Figure 4:
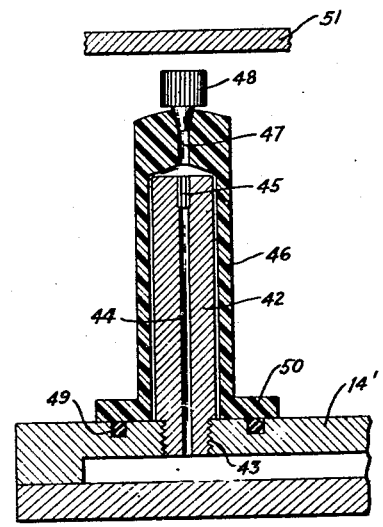
Figure 4 is a sectional side view of an article supporting and constraining device of modified form.

The device illustrated in Figure 4 comprises an inner supporting member or post 42 which is threaded into a wall or a casing 14' at 43. The post 42 has an air passage 44 therethrough through which air may be withdrawn or compressed air be applied. A restricted passage portion 45 limits the rate of flow through the passage 44. The post 42 is adapted to support the hollow barrel 46 of a hypodermic syringe of thermoplastic material which is to be sterilized. The bore 47 in the barrel into which a needle assembly may later be inserted is closed during the sterilizing process by a seal or stopper 48. A further seal or gasket 49 in the casing 14' seals the flange portion 50 of the syringe barrel with respect to the casing 14'.

In the use of the device, air is first withdrawn from the interior of the casing 14', whereby the flange portion 50 of the barrel seats tightly against the gasket 49. Heat is then applied for the purpose of sterilizing the barrel 46. The heat causes the barrel to soften, but distortion or collapse of the barrel is prevented by the post 42 against which the walls of the barrel are pressed by external pressure.

After sterilization the vacuum in the casing 14' is relieved. Air under pressure may then be applied to the interior of the casing 14' forcing the barrel 46 off the post. The capillary passage 45 prevents escape of large amounts of air after the seal at 49 is broken or the barrel entirely removed from its support. A stop 51 may be provided for the purpose of limiting the movement of the barrel under action of the pressure.

The invention thus provides a simple and efficient device for heat sterilizing hollow articles of thermoplastic material which, by reason of their heat deformability present problems in sterilizing.

Obviously, the present invention is not restricted to the specific embodiments herein shown and described, but may, with equal benefit, be applied or adapted to other forms of thermoplastic parts. Also the construction of the device may be modified without departing from the spirit and the essence of the present invention.

What is claimed is:

1. A device for sterilizing hollow elements of hypodermic syringes, said elements being of substantially cylindrical shape and having an open ended flange at one end and an apertured end wall at the other end, said elements being made of thermoplastic material assuming a plastic state at sterilizing temperatures, the device comprising a chamber; means for heating the interior of said chamber; a rigid post mounted inside said chamber, said post having a cylindrical outside surface thereon and a shoulder extending substantially normal to said cylindrical surface at the base of said post; a sealing ring in said shoulder about said cylindrical surface for sealing the flange of said hollow syringe element with respect to said surface, said post having a passage therethrough, one end of said passage terminating at said outside surface of the post, and a source of a pressure, the other end of said passage being in communication with said source of pressure.

2. A device for sterilizing hollow elements of hypodermic syringes, said elements being of substantially cylindrical shape and having an open-ended flange at one end and an apertured end wall at the other end, said elements being made of thermoplastic material assuming a plastic state at sterilizing temperatures, the device comprising, a chamber; means for heating the interior of said chamber; a rigid hollow member mounted inside said chamber, said member having a molding surface thereon including a cylindrical surface portion said member further including a shoulder surface extending substantially at right angles from said cylindrical surface for supporting the flange of said element; a sealing ring recessed in said shoulder surface for sealing said flange with respect to said shoulder surface, said member further having a passage therethrough, one end of said passage terminating at said molding surface at a point most remote from the sealing ring; and a source of pressure lower than the pressure in said chamber, the other end of said passage being in communication with said source of pressure.

3. A device for sterilizing hollow elements of hypodermic syringes, said elements being of substantially cylindrical shape and having an open-ended flange at one end and an apertured end wall at the other end, said elements being made of thermoplastic material assuming a plastic state at sterilizing temperatures, the device comprising, a chamber; means for heating the interior of said chamber; a rigid substantially cup shaped member mounted inside said chamber, said member having molding surface thereon including an interior cylindrical surface portion, said member further including a shoulder surface extending substantially at right angles from said surface portion for supporting the flange of said element; a sealing ring recessed in said shoulder surface for sealing said flange with respect to said shoulder surface; sealing means at the bottom of the cup shaped member for engaging and sealing the aperture in the end wall of said element, said member having a passage therethrough, one end of said passage terminating at said surface; at a point most remote from said sealing ring; and a source of pressure lower than the pressure in said chamber, the other end of said passage being in communication with said source of pressure.

PAUL KOLLSMAN.

REFERENCES CITED

The following references are of record in the file of this patent:

UNITED STATES PATENTS

| Number | Name | Date |
| --- | --- | --- |
| 763,550 | Field | June 28, 1904 |
| 1,090,535 | Hill | Mar. 17, 1914 |
| 1,232,573 | Lee | July 10, 1917 |
| 1,263,462 | Payne | Apr. 23, 1918 |
| 1,271,843 | Bradley | July 9, 1918 |